United States Patent [19]

Takase et al.

[11] 4,323,747
[45] Apr. 6, 1982

[54] SAFETY APPARATUS FOR MICROWAVE COOKING DEVICES

[75] Inventors: Tadayoshi Takase, Nagoya; Yoshihiro Kanaya, Konan, both of Japan

[73] Assignee: Rinnai Kabushiki Kaisha, Fukuzumi, Japan

[21] Appl. No.: 123,734

[22] Filed: Feb. 22, 1980

[30] Foreign Application Priority Data

Jul. 26, 1979 [JP] Japan .................... 54-102334[U]

[51] Int. Cl.$^3$ .................... H05B 6/68; H01H 9/22
[52] U.S. Cl. .................... 219/10.55 C; 126/197; 200/50 A; 200/50 C; 200/61.62; 307/141.8; 361/115; 361/192
[58] Field of Search .................... 219/10.55 C, 10.55 B; 200/50 A, 50 C, 50 R, 61.62, 61.64; 361/115, 94, 89, 192, 193; 126/197; 307/141.8, 141.4

[56] References Cited

U.S. PATENT DOCUMENTS

| | | | |
|---|---|---|---|
| 3,504,144 | 3/1970 | Horner | 219/10.55 C X |
| 3,639,717 | 2/1972 | Mochizuki | 2189/10.55 C X |
| 3,699,300 | 10/1972 | Buerki | 361/192 X |
| 4,054,769 | 10/1977 | Anderson et al. | 219/10.55 C |
| 4,117,294 | 9/1978 | Appelquist et al. | 219/10.55 C |
| 4,177,370 | 12/1979 | Otani | 219/10.55 C X |

FOREIGN PATENT DOCUMENTS 54-139145 10/1979 Japan .................... 219/10.55 C Primary Examiner—B. A. Reynolds
Assistant Examiner—Philip H. Leung
Attorney, Agent, or Firm—Leonard Bloom

[57] ABSTRACT

A safety arrangement for microwave ovens or similar cooking devices, in which a circuit breaking element and a main switch, which is arranged to be open in conjunction with an unlocking operation of a lock for a door, are interposed in a load circuit connecting between an electric source of power and a load. A first door switch is arranged to be closed when the door is opened and is connected to the load circuit in parallel with the load. An auxiliary switch becomes opened upon unlocking of the lock, and is connected in the load circuit on the load side of the first door switch. A second door switch becomes opened with a delayed time interval after closing of the first door switch, by opening of the door, and is connected to the load circuit on the electrical power source side of the first door switch. The door switches become operated by a door arm extending from the door.

3 Claims, 2 Drawing Figures

SAFETY APPARATUS FOR MICROWAVE COOKING DEVICES

BACKGROUND OF THE INVENTION

This invention relates to a safety apparatus for a microwave cooking device.

For apparatus of this species, there has been heretofore proposed such a type that a fuse or a breaker and a main switch which is arranged to be opened in conjunction with an unlocking operation of a lock means for a door, are interposed in a load circuit connected between an electrical power source and a load. A door switch which is arranged to be closed when the door is opened, is so connected to the load circuit, as to be in parallel with the load. A subsidiary or auxiliary switch which is arranged to be opened in conjunction with the unlocking operation of the foregoing lock means, is so interposed in the load circuit as to be positioned on the load side of the foregoing door switch.

In this known type of apparatus, however, after the door is fully opened, the door switch remains closed for the establishment of the short-circuit passage, and accordingly it is ready for breaking of the circuit or fuse, that is, for detecting of trouble with the main switch, and this is not always desirable. Thus, it is more or less dangerous and unnecessary that the short-circuit passage remains established still after the door is fully opened.

SUMMARY OF THE INVENTION

A safety arrangement for microwave cooking devices or ovens in which a fuse or circuit breaker and a main switch, are connected in a load circuit which connects between an electrical power source and a load. The main switch is arranged to be opened in conjunction with an unlocking operation of a lock for a door.

According to the present invention, furthermore, a door switch is arranged to be closed when the door is open and is connected to the load circuit in parallel with the load. An auxiliary switch becomes opened upon an unlocking operation of the lock, and is connected in the load circuit on the load side of the first-mentioned door switch. A second door switch becomes opened with a delayed time after closure of the first door switch by opening the door, and it is connected to the load circuit on the electrical power source side of the first door switch.

The first door switch and the second door switch become operated by a door arm extending from the door.

The novel features which are considered as characteristic for the invention are set forth in particular in the appended claims. The invention inself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
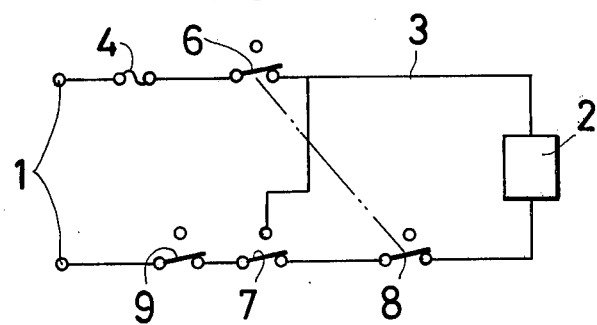
FIG. 1 is a circuit diagram of one embodying example of this invention.

Referring to the drawings a fuse or a circuit breaker 4 and a main switch 6 which is arranged to be opened in conjunction with an unlocking operation of a lock means for a door 5, are interposed in a load circuit 3 connected between an electrical power source 1 and a load 2. A door switch 7 is normally in an "open" position when the door is closed, as shown in FIG. 1, to complete the circuit from the power source 1 to the microwave load 2. However, switch 7 is arranged to be "closed" when the door is opened, thereby establishing a short circuit across the power source 1 and in parallel with the load 2. A subsidiary or auxiliary switch 8 which is arranged to be opened in conjunction with the unlocking operation of the foregoing lock means, is so interposed in the load circuit 3, as to be positioned on the load 2 side of the foregoing door switch 7. The present invention has the feature that a second door switch 9 which is arranged to be opened with a delayed time after the closing of the door switch 7 by opening of the door 5, is so connected to the load circuit 3, as to be positioned on the electrical power source 1 side of the door switch 7.

Figure 2:
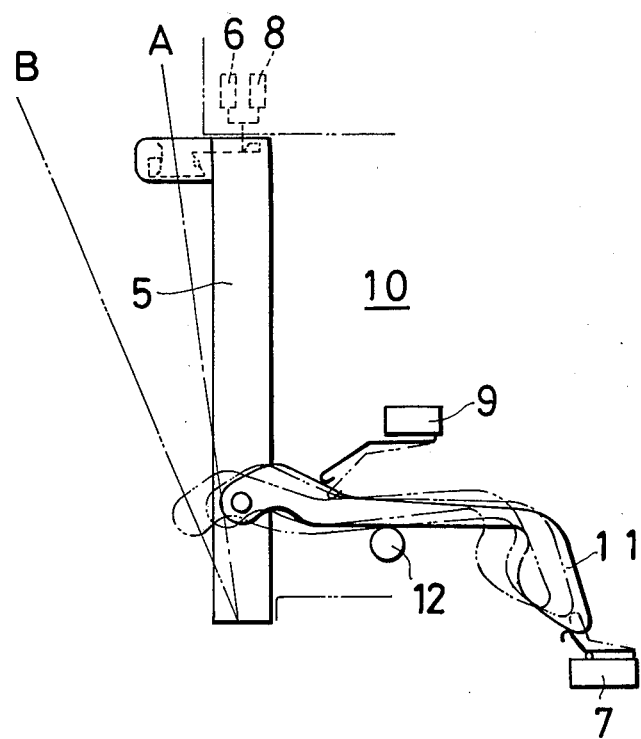
FIG. 2 is a diagrammatical side view of elements associated with the present invention.

A circuit diagram of one example of this invention is shown in FIG. 1, and the relations between respective operative points of the door switch 7 and the second door switch 9 are as shown in FIG. 2. Thus, it is so arranged that when the door on the front side of a heating chamber 10 is opened to the left in this figure, the door switch 7 is first closed at a position of a line A, and then the second door switch 9 is opened at a position of a line B. In particular, the above operation is achieved through a door arm 11 projecting from the door 5 in such a manner that in the course when the door 5 is being opened, the door switch 7 is first released from a pushing force of the door arm 11, and then the second door switch 9 is released from a pushing force thereof. Reference number 12 denotes a roller cooperating with the arm 11.

In operation of the present invention, if the unlocking operation of the lock means is first effected for opening the door 5, the main switch 6 and the subsidiary switch 8 are opened, and if the door 5 is then opened, the door switch 7 is first closed and thereby a short-circuit passage is established for being ready for circuit breaking of the fuse or the like by melting, for example.

This is not different from that in the previously proposed arrangement. According to the present invention, if the door 5 is further opened, the second door switch 9 is then opened and thereby the foregoing short-circuit passage is cut off to become inoperative. Consequently, the apparatus is ready for the circuit breaking by the fuse through melting only at a halfway angular opening position of the door 5, and no fuse circuit breaking occurs at further opening positions of the door.

Thus, according to the present invention, in the course of opening of the door 5, the door switch 7 is first closed and thereby the short-circuit passage is established for the detecting operation. The second door switch 9 is then opened and the short-circuit passage becomes thereby inoperative. As a result, the foregoing disadvantage in such type of apparatus which remains in its operative condition still after the door 5 is fully opened, can be removed, and the degree of safety can be improved.

Without further analysis, the foregoing will so fully reveal the gist of the present invention that others can, by applying current knowledge, readily adapted for various applications without omitting features that, from the standpoint of prior art, fairly constitutes essential characteristics of the generic or specific aspects of this invention, and therefore, such adaptations should and are intended to be comprehended within the meaning and range of equivalence of the following claims.

What is claimed is:

1. A safety apparatus for a microwave cooking device, comprising, in combination, a source of electrical power; a load; a load circuit connected between said source and said load; door means with lock means; circuit breaking means and main interlocking switch means in said load circuit, the main interlocking switch means arranged to be opened upon an unlocking operation of said lock means; first door switch means mechanically coupled to the door means and arranged to be closed when said door means is opened by a predetermined amount, whereby a short circuit is established across the power source and in parallel with said load, the short circuit thereby detecting a failure of the main interlocking switch means to open in response to unlocking of the lock means, and whereby, upon the failure of the main interlocking switch means to open, the circuit breaking means will open to interrupt the circuit from the power source to the load; and a second door switch means connected to said load circuit on the electrical power source side of said first door switch means, said second door switch means being mechanically coupled to the door means and being opened when the door means is opened by a further predetermined amount, thereby disabling the short circuit once the failure of the main interlocking switch means has been detected and the circuit breaking means has been opened in response thereto.

2. A safety apparatus as claimed in claim 1, wherein said first door switch means and said second door switch means are arranged to be operated by a door arm extending from said door means.

3. The combination of claim 1, further including an auxiliary interlocking switch connected on the load side of the first door switch means and arranged to be opened upon an unlocking operation of said lock means.

* * * * *